(12) United States Patent
Sawada et al.

(10) Patent No.: US 8,388,052 B2
(45) Date of Patent: Mar. 5, 2013

(54) DEFLECTOR APPARATUS FOR VEHICLE

(75) Inventors: Kazuki Sawada, Handa (JP); Yoshitaka Ide, Anjo (JP); Shinichi Hiramatsu, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/137,110

(22) Filed: Jul. 21, 2011

(65) Prior Publication Data

US 2012/0056449 A1 Mar. 8, 2012

(30) Foreign Application Priority Data

Aug. 2, 2010 (JP) ................................. 2010-173896

(51) Int. Cl.
*B60J 7/22* (2006.01)
(52) U.S. Cl. ........................................................ 296/217
(58) Field of Classification Search .................... 296/217
See application file for complete search history.

(56) References Cited

U.S. PATENT DOCUMENTS

| | | | | |
|---|---|---|---|---|
| 6,666,503 B1 * | 12/2003 | Sorensen | ...................... | 296/217 |
| 7,000,981 B2 * | 2/2006 | Raasakka | ...................... | 296/217 |
| 7,059,668 B2 * | 6/2006 | Van De Putten et al. | ..... | 296/217 |
| 7,866,741 B2 * | 1/2011 | Horiuchi et al. | .............. | 296/217 |
| 2008/0246306 A1 | 10/2008 | Oerke et al. | | |

FOREIGN PATENT DOCUMENTS

| | | | |
|---|---|---|---|
| EP | 0490213 | * | 12/1991 |
| JP | 2009-515748 | | 4/2009 |

* cited by examiner

*Primary Examiner* — Dennis Pedder
(74) *Attorney, Agent, or Firm* — Finnegan, Henderson, Farabow, Garrett & Dunner, L.L.P.

(57) ABSTRACT

A deflector apparatus for a vehicle includes the deflector body configured to be provided along a front edge portion of an opening portion formed on a roof portion of a vehicle and to be deployed by projecting above a surface of the roof portion. The deflector body includes a mesh member extending along the front edge portion of the opening portion. The deflector apparatus for the vehicle also includes a pair of resin frames provided at end portions of the mesh member in a widthwise direction of the mesh member respectively to extend in a lengthwise direction of the mesh member over an entire length of the mesh member. The pair of resin frames is resin-molded integrally with the mesh member and covers the end portions of the mesh member including edges of the mesh member in the widthwise direction of the mesh member.

5 Claims, 6 Drawing Sheets

DEFLECTOR APPARATUS FOR VEHICLE

CROSS REFERENCE TO RELATED APPLICATIONS

This application is based on and claims priority under 35 U.S.C. §119 to Japanese Patent Application 2010-173896, filed on Aug. 2, 2010, the entire content of which is incorporated herein by reference.

TECHNICAL FIELD

This disclosure generally relates to a deflector apparatus for a vehicle.

BACKGROUND DISCUSSION

A known deflector apparatus for a vehicle disclosed in US2008/246306 (hereinafter referred to as Patent reference 1) is mounted on a front edge portion of an opening portion formed on a roof portion of the vehicle so as to rise and stand above a surface of the roof portion in a projecting manner, for example, when a movable panel movable so as to open and close the opening portion is opened. The known deflector apparatus includes a fixed frame which is provided along the front edge portion of the opening portion and is fixedly attached to a mounting frame of the opening portion, and a movable frame which is connected via a pivot device to the fixed frame in a pivotable manner and is movable relative to the fixed frame between a retracted position and a deployed position. A mesh member having flexibility and a permeability is provided between the fixed frame and the movable frame. When the movable frame moves to the deployed position, the mesh member is pulled by the movable frame and projects above the surface of the roof portion together with the movable frame. At least a part of a surface of the mesh portion allows air to flow therethrough.

According to the known deflector apparatus disclosed in the Patent reference 1, a connecting method including a clamp, welding, sewing, bonding, inserting or the like is used in order to connect end portions of the mesh member to the fixed frame and/or to the movable frame (a connecting element). Thus, a connecting process is needed where the mesh member and the frames that are manufactured independently from one another are connected to one another, which may increase a manufacturing man-hour. In addition, a relative positional misalignment between the mesh member and the frames is likely to occur during the connecting process, and thus, for example, wrinkles may occur on the mesh member. In this case, an appearance of the mesh member, when the mesh member projects above the surface of the roof portion together with the movable frame, may be impaired.

A need thus exists for a deflector apparatus for a vehicle, which is not susceptible to the drawback mentioned above.

SUMMARY

According to an aspect of this disclosure, a deflector apparatus for a vehicle includes the deflector body configured to be provided along a front edge portion of an opening portion formed on a roof portion of a vehicle and to be deployed by projecting above a surface of the roof portion. The deflector body includes a mesh member extending along the front edge portion of the opening portion. The deflector apparatus for the vehicle also includes a pair of resin frames provided at end portions of the mesh member in a widthwise direction of the mesh member respectively to extend in a lengthwise direction of the mesh member over an entire length of the mesh member. The pair of resin frames is resin-molded integrally with the mesh member and covers the end portions of the mesh member including edges of the mesh member in the widthwise direction of the mesh member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
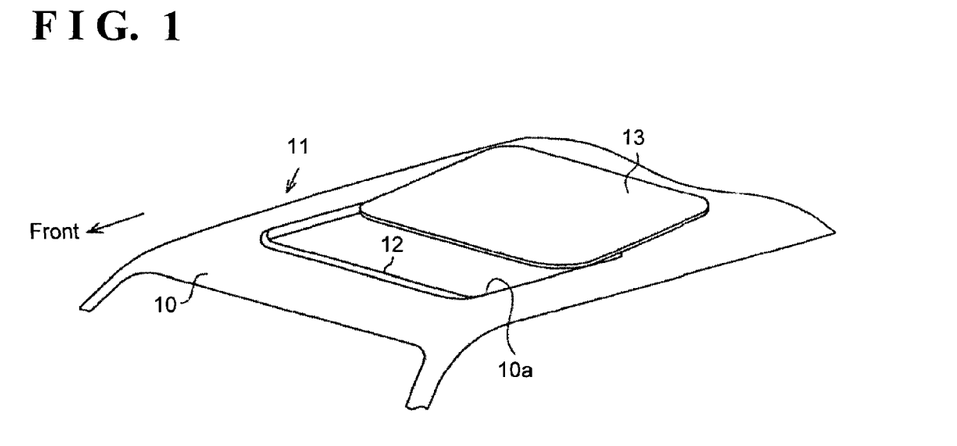
FIG. 1 is a perspective view of a sunroof apparatus of an embodiment disclosed here, which is mounted on a roof portion of a vehicle.

A first embodiment of this disclosure will be explained with reference to illustrations of FIGS. 1 to 7 of the attached drawings. FIG. 1 is a schematic view of a sunroof apparatus 11, viewed from diagonally above, mounted on a roof 10 serving as a roof portion of a vehicle including, but not limited to, a motor vehicle. As shown in FIG. 1, the roof 10 includes a roof opening portion 10a having a substantially rectangular shape and serving as an opening portion. The sunroof apparatus 11 includes a deflector 12 that is disposed at and is supported by a front edge portion of the roof opening portion 10a. The deflector 12 serves as a deflector apparatus for a vehicle. The sunroof apparatus 11 also includes a movable panel 13 formed into a substantially rectangular shape and made of, for example, a glass plate, for opening and closing the roof opening portion 10a by moving in a front/rear direction. As used herein, the terms "a front/rear direction", "a width direction", "a vertical direction (an up/down direction)" and derivatives thereof refer to the directions relative to the vehicle in the state where the sunroof apparatus 11 is mounted on the vehicle.

The deflector 12 is mounted on the roof opening portion 10a of the roof 10 in a manner so that so-called a tilt-up movement of the deflector 12 is allowed, that is, the deflector 12 is pivotable about a rear portion thereof and thus a front portion of the deflector 12 is movable upward. When the movable panel 13 moves for opening the roof opening 10, the deflector 12 is released from the movable panel 13 and tilts upward so as to project above an upper surface (i.e., a surface) of the roof 10 (a deployed state). When the movable panel 13 moves for closing the roof opening 10, the deflector 12 is pushed downward by the movable panel 13 and is retracted below the upper surface of the roof 10 (a retracted state). When the roof opening portion 10a opens, the deflector 12 comes to be in the deployed state, thereby restricting an air vibration caused by wind flowing into a vehicle cabin.

The movable panel 13 is mounted on the roof 10 in a manner that the tilt-up movement of the movable panel 13 is allowed, that is, the movable panel 13 is pivotable about a front portion thereof and thus a rear portion of the movable panel 13 is movable upward, and also in a manner that a sliding movement of the movable panel 13 in the front/rear direction is allowed. The movable panel 13 slides in the front/rear direction for opening and closing the roof opening 10 while remaining in a tilted-up state, that is, the movable panel 13 moves in a so-called outer sliding way.

Figure 2:
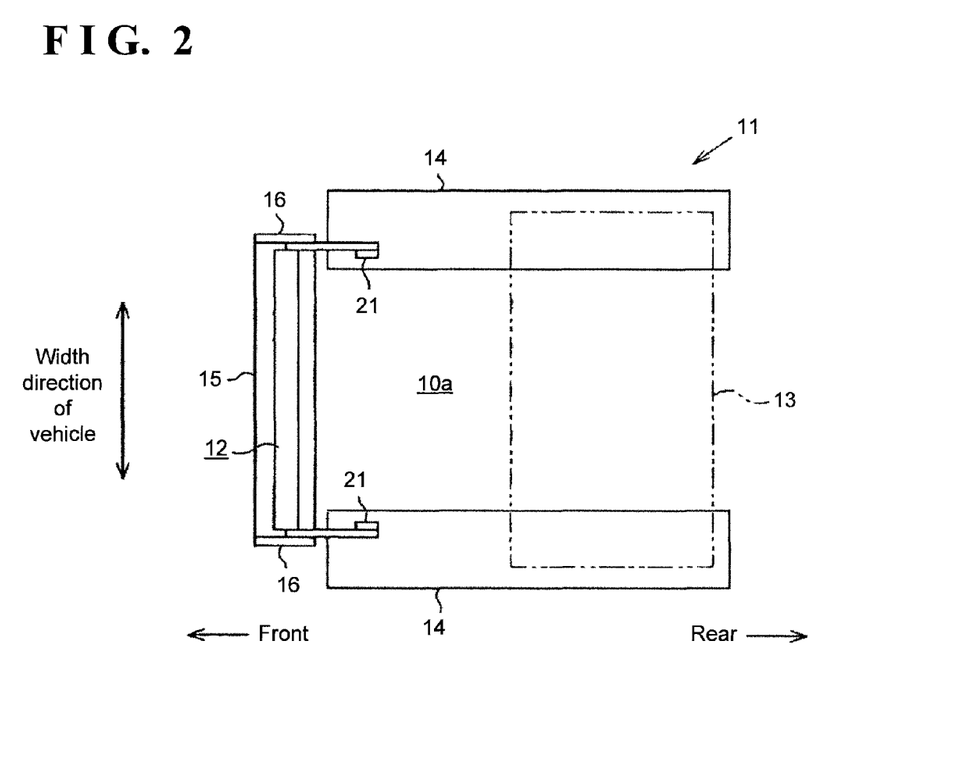
FIG. 2 is a plan view schematically illustrating the sunroof apparatus of the embodiment disclosed here.

As shown in FIG. 2, the sunroof apparatus 11 includes a pair of guide rails 14, 14 fixedly provided so as to be positioned at edge portions of the roof opening portion 10a respectively in the width direction. Each guide rail 14 having a constant cross section along a lengthwise direction thereof is made of an extrusion material including, but not limited to, aluminum alloy and extends in the front/rear direction. A drive mechanism is provided so as to slide on the guide rail 14 for actuating the movable panel 13 to slide for opening and closing the roof opening 10.

A retracting member 15 having a substantially U-shaped groove configuration is fixedly provided at the front edge portion of the roof opening portion 10a so as to extend in the width direction. A pair of guide members 16, 16 which is made of, for example, a resin material and is formed into a plate shape is attached to open ends of the retracting member 15 in the width direction respectively so as to close the open ends. Thus, the retracting member 15 and the pair of guide members 16, 16 establish a box-shaped configuration having an upward opening, thereby defining a retracting space of the deflector 12. Each of the pair of guide members 16, 16 includes a guide groove 16a (refer to FIG. 7) formed on an inner surface of the guide member 16 which faces the inner surface of the other guide member 16 in the width direction. A holding member 21 made of, for example, a resin material is fixedly attached to a front end portion of each guide rail 14. The holding members 21, 21, which are positioned at left and right sides of the vehicle, constitute a hinge portion of the deflector 12.

Figure 3:
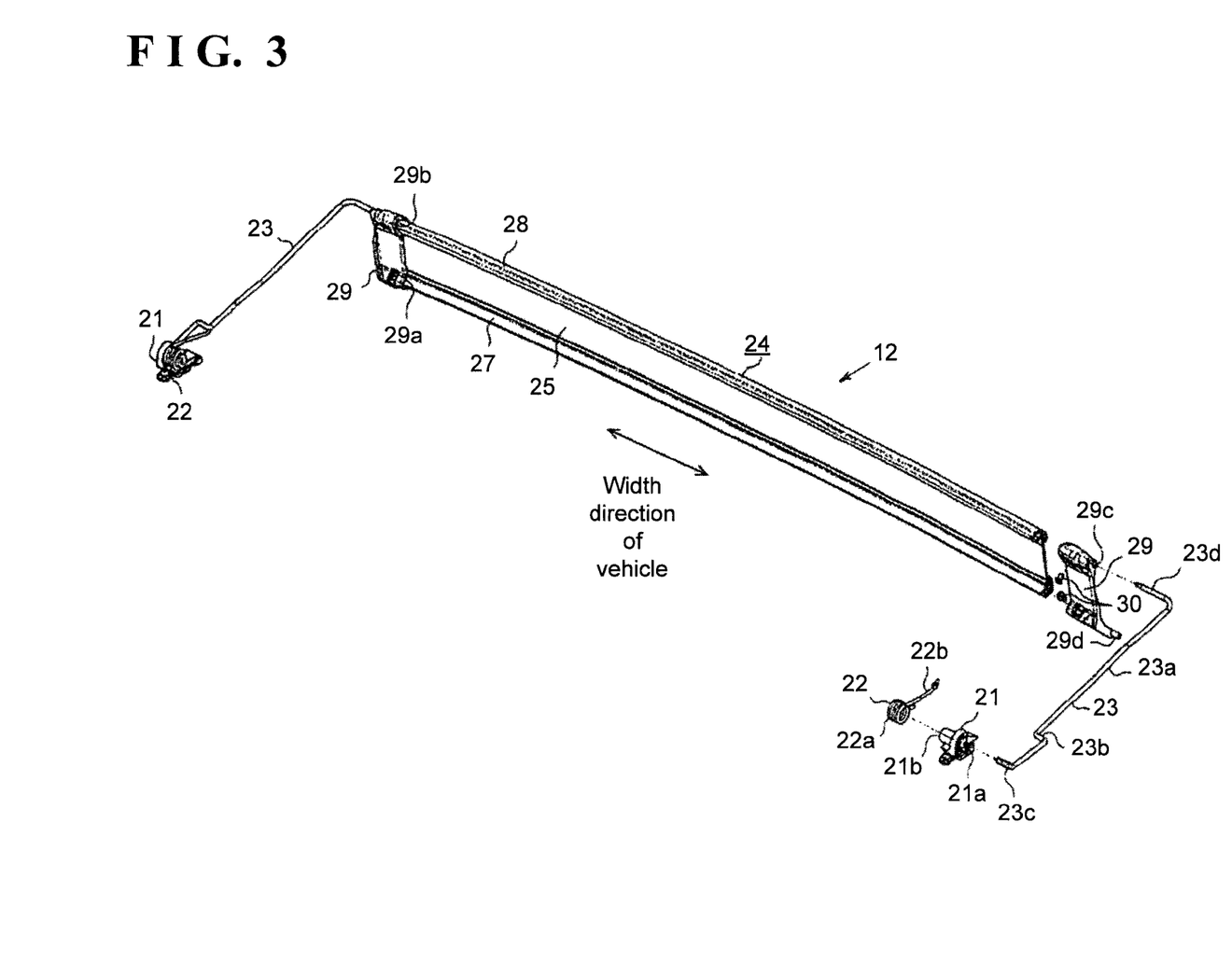
FIG. 3 is an exploded perspective view of a deflector of the embodiment disclosed here.
Figure 4A:
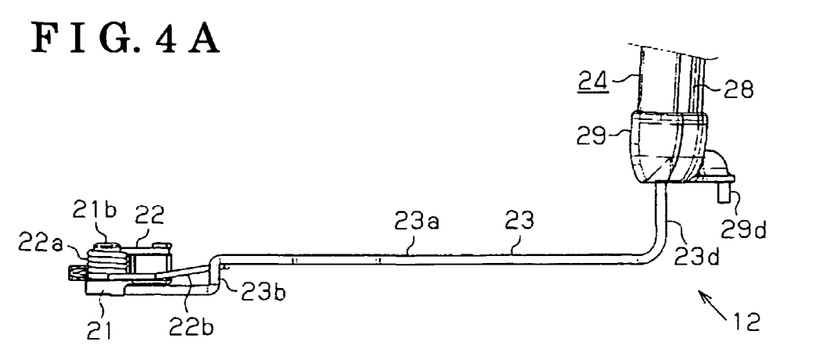
FIG. 4A is a plan view of an arm member of the embodiment disclosed here.
Figure 4B:
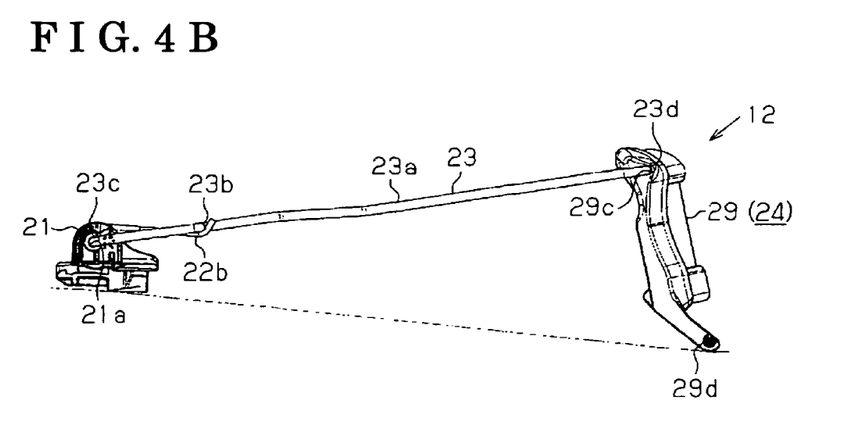
FIG. 4B is a side view of the arm member of the embodiment diklosed here.

Next, the deflector 12 and a structure for supporting the deflector 12 are further explained. FIG. 4A is a plan view and FIG. 4B is a side view of the deflector 12. As shown in FIG. 3, each holding member 21 includes a shaft bearing hole 21a formed on the holding member 21 in the width direction and having a round shape. The holding member 21 also includes a spring holding portion 21b formed on the holding member 21 so as to protrude inward in the width direction. The spring holding portion 21b has a substantially cylindrical shape and is concentric with the shaft bearing hole 21a. The spring holding portion 21b is inserted into a coil portion 22a of a torsion spring 22 of which one end portion is fastened to the holding member 21.

An arm member 23 made of a wire having a substantially circular cross section is connected to the holding member 21 in a pivotable manner. The arm member 23 includes an arm portion 23a extending in the front/rear direction and a spring engagement portion 23b formed on the arm member 23 by bending a portion of the arm member 23 in the width direction. The arm member 23 also includes a holding-side shaft portion 23c extending from a first end of the arm portion 23a so as to bend inward in the width direction. The holding-side shaft portion 23c is inserted in the shaft bearing hole 21a from outward in the width direction, and thus the arm member 23 is supported by the shaft bearing hole 21a in a pivotable manner. The spring engagement portion 23b engages with the other end portion 22b of the torsion spring 22 so as to be supported by the other end portion 22b from below so that the arm member 23 is biased in a direction in which a second end portion of the arm portion 23a moves upward. The arm member 23 includes a body-side shaft portion 23d extending from the second end portion of the arm portion 23a so as to bend inward in the width direction.

Figure 5:
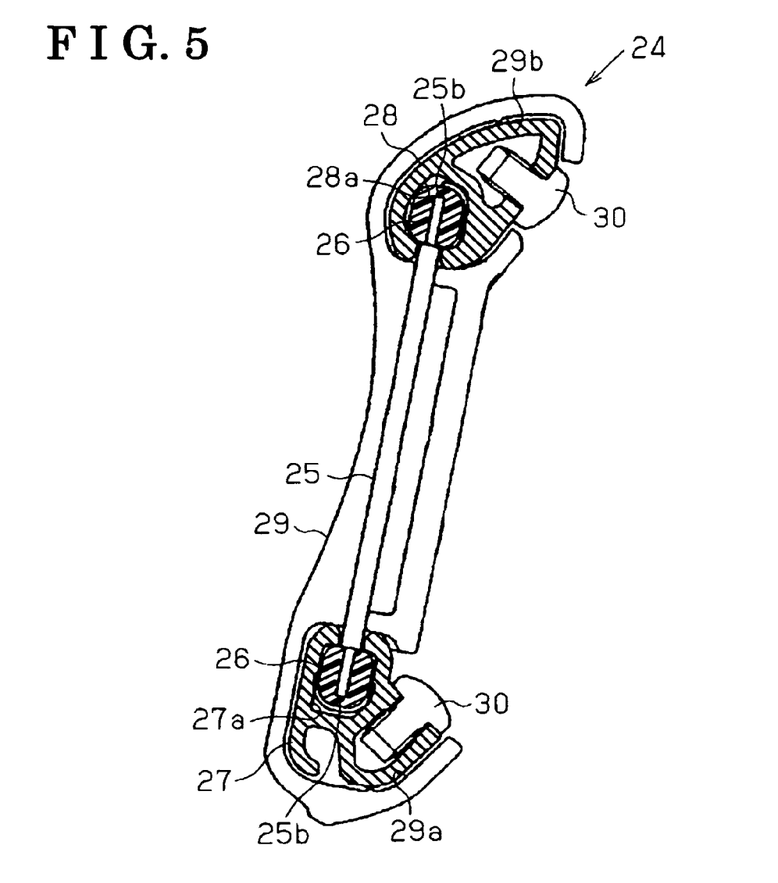
FIG. 5 is a cross-sectional view of a side frame of the embodiment disclosed here.

The body-side shaft portions 23d, 23d of the arm members 23, 23 which are positioned at left and right sides of the vehicle support a deflector body 24 having an elongated shape extending in the width direction. As shown in FIG. 5, the deflector body 24 includes a mesh member 25 that is made of, for example, a resin material and extends along the front edge portion of the roof opening portion 10a in the width direction. In FIG. 5, the hatching of the cross section of the mesh member 25 is omitted for clarity of the illustration. The deflector body 24 also includes a pair of resin frames 26, 26 provided at end portions of the mesh member 25 in a widthwise direction of the mesh member 25 so as to extend in a lengthwise direction of the mesh member 25 over an entire length thereof. The pair of resin frames 26, 26 is made of a resin material, for example, in an extrusion-molding process, so as to be integral with the mesh member 25. The deflector body 24 further includes a first frame 27 and a second frame 28 both of which extend in a lengthwise direction of the pair of resin frames 26, 26. The first frame 27 and the second frame 28 serve as a first metal frame and a second metal frame respectively. The deflector body 24 also includes a pair of side frames 29, 29 extending in a widthwise direction of the mesh member 25.

Figure 6:
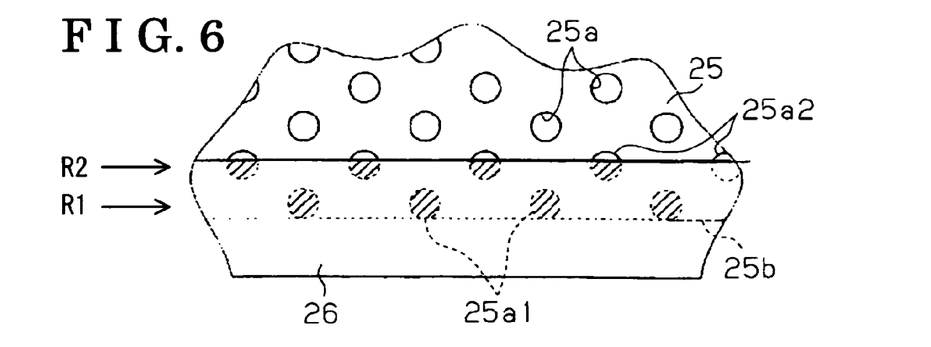
FIG. 6 is a front view of a mesh member of the embodiment disclosed here.

As shown in FIG. 6, the mesh member 25 is formed with plural through holes 25a that are regularly arranged over a surface of the mesh member, that is, the surface extending in the lengthwise and widthwise directions thereof. The through holes 25a are arrayed in rows at a regular spacing and the rows are arranged parallel to one another in the widthwise direction of the mesh member 25. The plurality of through holes 25a include first through holes 25a1 arrayed in a first row R1 at a regular spacing in the lengthwise direction of the mesh member 25 and second through holes 25a2 arrayed in a second row R2 at the regular spacing in the lengthwise direction of the mesh member 25. The first row R1 and the second row R2 are arranged to alternate with each other in the widthwise direction of the mesh member 25, and the first row R1 and the second row R2 offset in the lengthwise direction of the mesh member 25 by substantially half the regular spacing. In other words, the through holes 25a are arranged in a staggered arrangement. Edges 25b, 25b of the mesh portion 25 in the widthwise direction thereof are embedded inside the pair of resin frames 26, 26 respectively. More specifically, the first through holes 25a1 in the first row R1 and at least a part of each of the second through holes 25a2 in the second row R2 are embedded as shown in FIG. 6.

As shown in FIG. 5, the resin frames 26, 26, each of which is formed so as to have a substantially three-sided rectangular shape, cover the end portions of the mesh member 25 in the widthwise direction thereof, including the edges 25b, 25b. Thus, the resin frames 26, 26 are connected to or attached to the mesh member 25 via the plural through holes 25a in a secure manner during the extrusion-molding process (refer to FIG. 6).

The first frame 27 and the second frame 28 are made of, for example, aluminum alloy and engage with the pair of resin frames 26, 26 respectively, which are provided at one end and the other end (a lower end and an upper end in FIG. 5, respectively) of the mesh member 25 in the widthwise direction, over the entire length of the resin frame 26 in the lengthwise direction. The first frame 27 and the second frame 28 include an engaging face 27a and an engaging face 28a each of which has a substantially C-shaped cross section and covers an outer surface of the corresponding resin frame 26. In order to engage and attach the pair of resin frames 26, 26, to the first frame 27 and to the second frame 28 respectively, the pair of resin frames 26, 26 is slid in the engaging face 27a and the engaging face 28a respectively in the lengthwise direction thereof. Therefore, a clearance is provided between each of the engaging face 27a and the engaging face 28a, and the outer surface of the corresponding resin frame 26 in order to allow the sliding movement of the first frame 27 and the second frame 28 relative to the corresponding resin frame 26.

Figure 8:
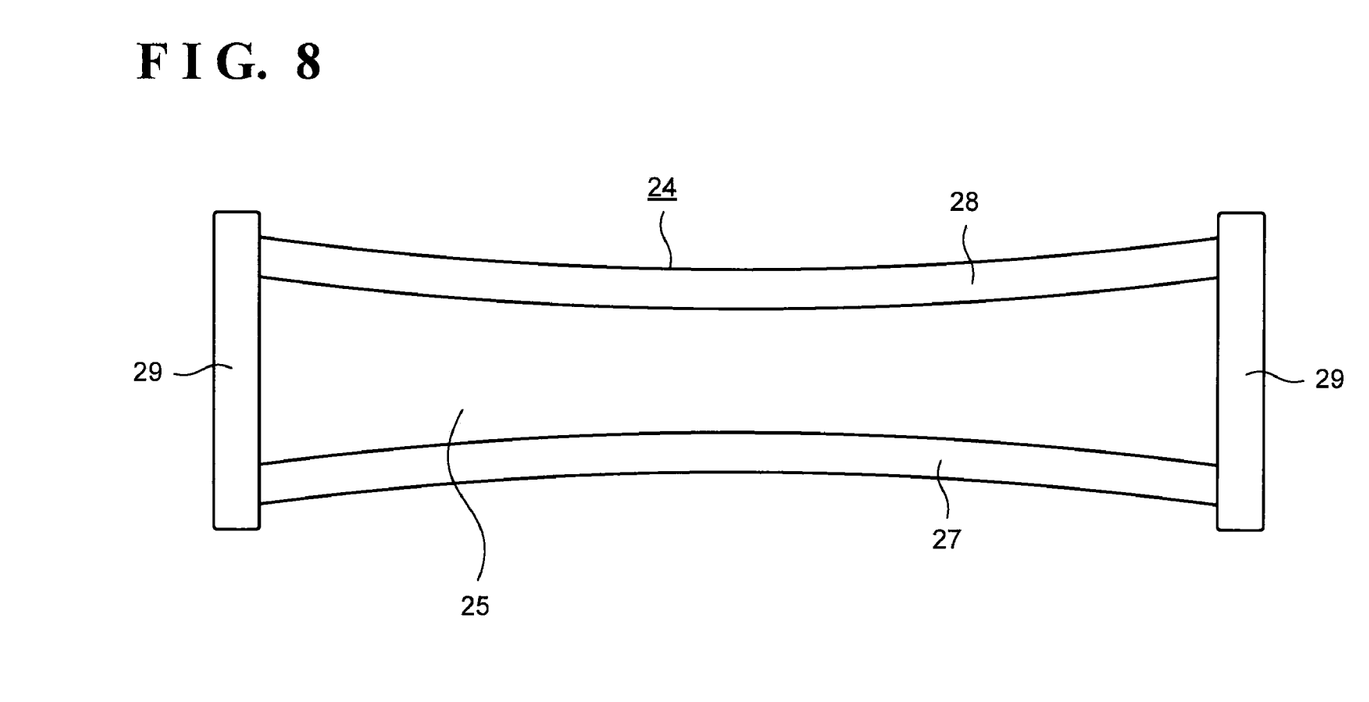
FIG. 8 is an non-scaled view of a deflector of the embodiment disclosed here.

As depicted in FIG. 8, the first frame 27 and the second frame 28 are formed so as to be curved in a middle portion of the first frame 27 and the second frame 28 in the lengthwise direction thereof in a manner that the first frame 27 and the second frame 28 are away from each other in the widthwise direction of the mesh member 25. Thus, the first frame 27 and the second frame 28 are formed into a substantially bow shape. It should, however, be noted that the curvatures of first frame 27 and second frame 28 in FIG. 8 may not be drawn to scale: rather, the bow shapes of first frame 27 and second frame 28 may be exaggerated for illustrative purposes. Each of the side frames 29, 29, which extends in the widthwise direction of the mesh member 25, is connected to a respective end portion of the first frame 27 and to a respective end portion of the second frame 28 relative to the lengthwise direction of the first frame 27 and the second frame 28. Each of the side frames 29, 29 includes an engaging recess 29a and an engaging recess 29b to which the corresponding end portion of the first frame 27 and the corresponding end portion of the second frame 28 are coupled. The engaging recesses 29a and 29b of the side frames 29, 29 are fastened to the end portion of the first frame 27 and to the end portion of the second frame 28 by means of bolts 30, 30.

A distance between the first frame 27 and the second frame 28 in the widthwise direction of the mesh member 25 is set so as to be increased by means that the first frame 27 and the second frame 28 are connected to, that is, engage with the side frames 29, 29. Consequently, the mesh member tries to shrink when the first frame 27 and the second frame 28 engage with the side frames 29, 29, and thus a tension is generated at the mesh member 25. Thus, the tension is applied via the resin frames 26, 26 to an engaging portion between the resin frame 26 and the first frame 27 and to an engaging portion between the resin frame 26 and the second frame 28. This controls a clatter and an abnormal noise caused by the clatter from occurring between the resin frames 26, 26 and the first and second frames 27, 28.

As stated above, the first frame 27 and the second frame 28 are formed to be curved in the middle portion of the first frame 27 and the second frame 28 in the lengthwise direction thereof so that the first frame 27 and the second frame 28 are away from each other in the widthwise direction of the mesh member 25, that is, in a manner that the mesh member 25 is stretched in the widthwise direction thereof. Thus, the mesh member 25 tries to shrink when the first frame 27 and the second frame 28 engage with the side frames 29, 29, and thus the tension is generated at the mesh member 25 also in the middle portion of the first frame 27 and the second frame. In a manner similar to the above, this controls the clatter and the abnormal noise caused by the clatter from occurring between the resin frame 26 and the first and second frames 27, 28.

Figure 7:
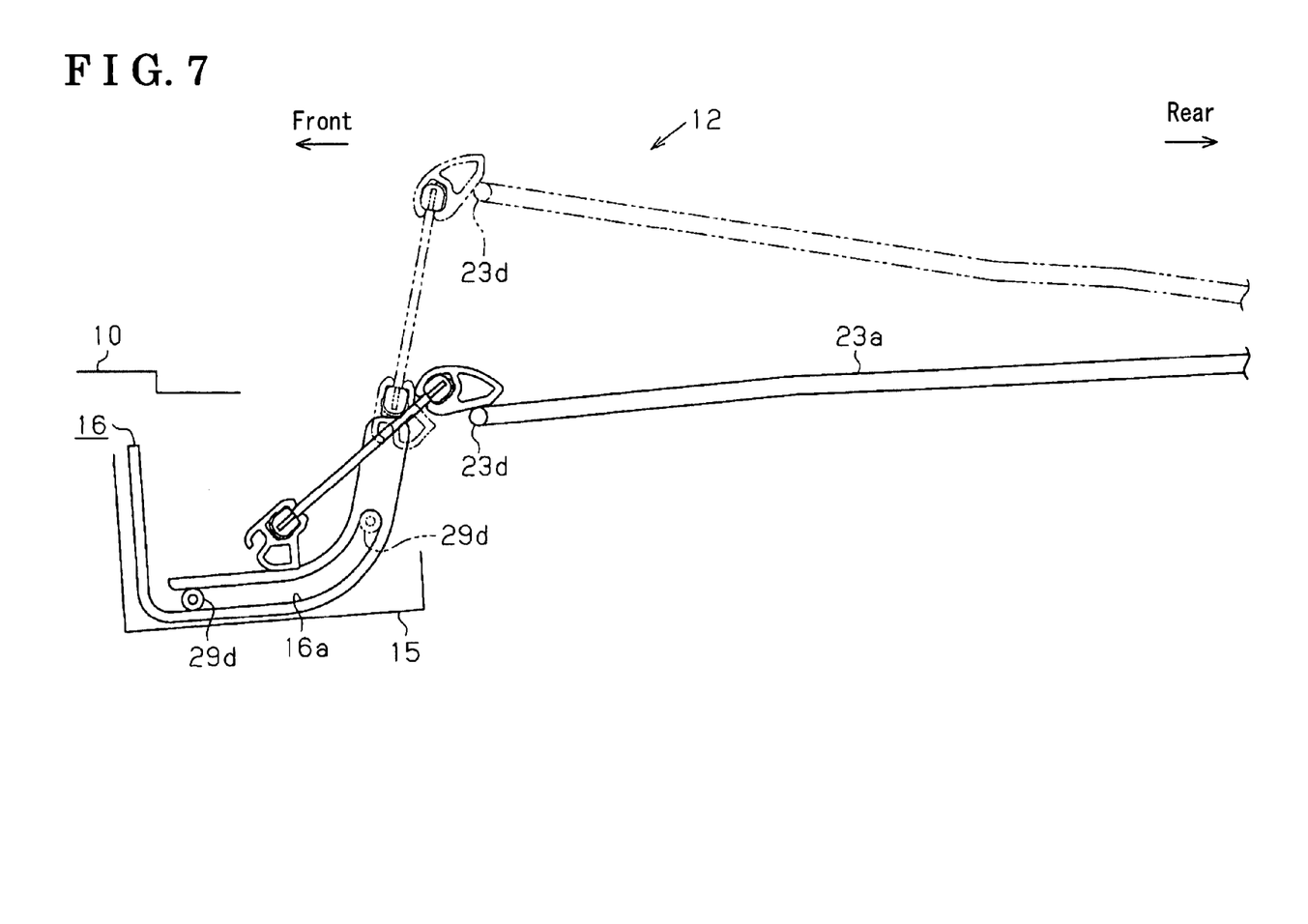
FIG. 7 is a schematic view illustrating an operation of the deflector of the embodiment disclosed here.

As shown in FIG. 3, each of the side frames 29, 29 includes a shaft bearing hole 29c which is formed so as to extend in the width direction at the engaging recess 29b and has a circular cross section. The shaft bearing hole 29c supports the body-side shaft portion 23d which constitutes the arm member 23 and is inserted into the shaft bearing hole 29c from outward in the width direction. Each of the side frames 29, 29 includes a guide pin 29d having a substantially cylindrical shape and provided at the engaging recess 29a so as to project outward in the width direction. The guide pin 29d is inserted into the guide groove 16a from inward in the width direction so that the guide pin 29 engages with the guide groove 16a in a manner so that the guide pin 29 moves inside the guide groove 16a therealong while rotating about a radial center of the guide pin 29. Thus, the mesh member 25 is supported by the guide members 16, 16 (provided on the roof 10) via the resin frames 26, 26, the first and second frames 27, 28, and the side frames 29, 29.

When the arm portion 23a biased by the torsion spring 22 pivots about the holding-side shaft portion 23c in the clockwise direction (i.e., a first direction) in FIG. 7, the guide pin 29d is guided by the guide groove 16a and moves in rearward and upward (i.e., one direction). The deflector body 24 is then deployed in a manner that the deflector body 24 projects above the upper surface of the roof 10. When the deflector body 24 comes to a deployed position, the guide pin 29d reaches a rear end of the guide groove 16a which extends in the upper direction. In other words, a posture of the deflector body 24 (in particular, a position of an upper end of the deflector body 24) in the deployed position is defined by means that the rear end of the guide groove 16a and the guide pin 29d coincide with each other.

On the other hand, when the arm portion 23a pivots about the holding-side shaft portion 23c in the counterclockwise direction (i.e., a second direction) in FIG. 7 against a biasing force of the torsion spring 22, the guide pin 29d is guided by the guide groove 16a and moves forward (i.e., the other direction). The deflector body 24 is then pulled below, that is, retracted below the upper surface of the roof 10. When the deflector body 24 is in the retracted position, the guide pin 29 is positioned at a front end of the guide groove 16a in the front/rear direction. In other words, when the deflector body 24 is in the retracted position, the deflector body 24 is retracted in the retracting member 15 in the state where the deflector body 24 is inclined in a front direction. Thus, a retracting space that is necessary to be provided below the upper surface of the roof 10, that is, a depth of the retracting member 15 in the vertical direction, is reduced by an amount that is allowed by the inclination of the deflector body 24.

As explained above, according to this embodiment, the following effects are obtained. According to this embodiment, the pair of resin frames 26, 26 is formed at the respective end portions of the mesh member 25 in the widthwise direction thereof by means of the extrusion-molding process. Thus, the resin frames 26, 26 are securely attached to the mesh member 25 so as to be integral with the mesh member 25 at the time when the resin frames 26, 26 are formed. Therefore, manufacturing man-hour, eventually a manufacturing cost, may be reduced compared to a case where the mesh member 25 and the pair of resin frames 26, 26 are formed independently from each other and attached to each other by means of an appropriate attaching method. In addition, in case that the mesh member 25 and the resin frames 26, 26 are formed independently from each other and attached to each other by means of the appropriate attaching method, wrinkles might occur on the mesh member 25 during the attaching process. However, according to this embodiment, such wrinkles may be controlled. In addition, a distance between the pair of resin frames 26, 26, which securely supports the mesh member 25 therebetween, is determined by means of resin-molding equipment (for example, a metal mold die) for forming the resin frames 26, and thus, a variation of the distance between the pair of resin frames 26, 26 may be controlled. Consequently, an appearance of the mesh member 25 (the deflector body 24) when the deflector body 24 projects above the upper surface of the roof 10 may be enhanced. In addition, each of the pair of resin frames 26, 26 has the substantially three-sided rectangular shape so as to cover the entire end portions of the mesh member 25 in the widthwise direction including the edges 25b, 25b, and thus a rigidity of the resin frame 26 increases corresponding to an increment in a modulus section of the resin frame 26.

According to this embodiment, the plurality of through holes 25a include the first through holes 25a1 arrayed in the first row R1 at the regular spacing in the lengthwise direction of the mesh member 25 and the second through holes 25a2 arrayed in the second row R2 at the regular spacing in the lengthwise direction of the mesh member 25. The first row R1 and the second row R2 are arranged to alternate with each other in the widthwise direction of the mesh member 25, and the first row R1 and the second row R2 offset in the lengthwise direction of the mesh member 25 by substantially half the regular spacing. Thus, the resin frames 26, 26 are connected to or attached to the mesh member 25 via the plural through holes 25a in a secure manner, thereby restricting the mesh member 25 from coming apart or detaching from the resin frames 26, 26.

In addition, even in case that an edge of the resin frame 26 in the widthwise direction thereof is positioned so as to lie across the through holes 25a that are arranged in the row in the lengthwise direction of the mesh member 25, a sufficient space is assured between the adjacent through holes 25a in the lengthwise direction of the mesh member 25. This may restrict a tear or a split of the mesh member 25 from originating from the through hole. In addition, a sufficient space is also assured between the adjacent through holes 25a in the widthwise direction of the mesh member 25. Consequently, sufficient engagement allowance between the mesh member 25 and the resin frames 26, 26 is assured, that is, the resin frames 26, 26 are connected to the mesh member 25 at a sufficient area, thereby restricting the split or the tear of the mesh member 25 from occurring.

According to this embodiment, the resin frames 26, 26 engage with the first and second frames 27, 28 respectively over the entire length of the resin frame 26 along the lengthwise direction thereof, and the end portions of the first frame 27 and the end portions of the second frame 28 in the lengthwise direction thereof are connected to the side frames 29, 29. Thus, the mesh member 25 is firmly supported in the lengthwise and widthwise directions thereof by the first and second frames 27, 28 and the side frames 29, 29, which may restrict the wrinkles from occurring on the mesh member 25. On the other hand, the distance between the first frame 27 and the second frame 28 in the widthwise direction of the mesh member 25 is increased by engaging the first and second frames 27, 28 with the side frames 29, 29 respectively, and thus, the tension is generated at the mesh member 25 in the direction in which the mesh member 25 shrinks. Thus, the tension is applied via the resin frame 26 to the engaging portion between the first frame 27 and the corresponding resin frame 26 and to the engaging portion between the second frame 28 and the corresponding resin frame 26. This may control the occurrence of the clatter between the resin frames 26, 26 and the first and second frames 27, 28, and the abnormal noise caused by such clatter.

According to this embodiment, the first frame 27 and the second frame 28 are formed so as to be curved in the middle portion of the first frame 27 and the second frame 28 in the lengthwise direction thereof in a manner that the first frame 27 and the second frame 28 are away from each other in the widthwise direction of the mesh member 25. In other words, the first frame 27 and the second frame 28 are formed in the above-described curved manner so that the mesh member 25 is stretched in the widthwise direction thereof. Thus, the occurrence of the clatter and of the abnormal noise caused by the clatter between the resin frame 26 and the first and second frames 27, 28 may be controlled.

According to this embodiment, the deflector body 24 is movable between the deployed position where the deflector body 24 projects above the upper surface of the roof 10 and the retracted position where the deflector body 24 is retracted below the upper surface of the roof 10. In particular, when the deflector body 24 is in the retracted position, the deflector body 24 is retracted below the upper surface of the roof in the state where the deflector body 24 is inclined in the front direction. Thus, the retracting space that is necessary to be provided below the upper surface of the roof 10, that is, the depth of the retracting member 15 in the vertical direction, is reduced. This enables the deflector body 24 (the mesh member 25) to be formed sufficiently long in the widthwise direction of the mesh member 25 so as to rise and stand sufficiently high in the deployed position, thereby allowing air to pass through the mesh member 25, that is, through the plural through holes 25a, when the deflector body 24 is in the deployed position. In addition, the position of the upper end portion of the deflector body 24 when the deflector body 24 is in the deployed position is defined by means that the rear end of the guide groove 16a and the guide pin 29d coincide with each other, and thus a variation of the position of the upper end portion of the deflector body 24 in the deployed position may be controlled.

According to this embodiment, the arm member 23 is made of the wire having a small space requirement. This restricts the arm member 23 from blocking an air flow outward of the deflector body 24 in the width direction of the vehicle and may eventually reduce a wind noise.

According to this embodiment, the arm member 23, which is assembled in advance on the deflector body 24, is attached to the holding member 21 in the following way. First, the arm member 23 is elastically deformed in an outward direction in the width direction of the vehicle and the holding-side shaft portion 23c is inserted into the shaft bearing hole 21a of the holding member 21 by using a counterforce generated due to the elastic deformation of the arm member 23. Next, the other end portion 22b of the torsion spring 22 that is provided in advance at the holding member 21 is engaged with the spring engagement portion 23b of the arm member 23 while moving the other end portion 22b of the torsion spring 22 in the width direction of the vehicle. Thus, an attachment operation of the arm member 23, which is assembled in advance on the deflector body 24, to the holding member 21 (that is, to the roof 10) is completed. On the other hand, the arm member 23 and the deflector body 24 to which the arm member 23 is assembled on and removed from the holding member 21 in the following way. First, the other end portion 22b of the torsion spring 22 which engages with the spring engagement portion 23b is moved in the width direction of the vehicle so as to be disengaged from the spring engagement portion 23b. Next, the arm member 23 is elastically deformed in the outward direction in the width direction of the vehicle and the holding-side shaft portion 23c is pulled out of the shaft bearing hole 21a of the holding member 21. Thus, the arm member 23 is removed from the holding member 21, that is, from the roof 10 while retaining the state where the arm member 23 is assembled on the deflector body 24. As explained above, in the state where the arm member 23 is assembled on the deflector body 24, the arm member 23 is attached to and removed from the holding portion 21, that is, the roof 10 while maintaining the holding member 21 fixedly attached to a front end portion of the roof opening portion 10a. This may enhance maintainability, including an ease of cleaning and replacing of the deflector 12. In particular, the deflector 12 may be attached to and removed from the roof 10 without the need for tools or the like.

Changes may be made to this embodiment as follows. For example, a pad for filling a clearance between the first and second frames 27, 28 and the corresponding resin frame 26 may be adhesively provided between the first and second frames 27, 28 and the corresponding resin frame 26, in the middle portion thereof in the lengthwise direction thereof. This may control the occurrence of the clatter between the first and second frames 27, 28 and the corresponding resin frame 26, and the abnormal noise caused by such clatter especially in the middle portion of the first and second frames 27, 28 in the lengthwise direction thereof, where the tension generated on the mesh member 25 works insufficiently.

Further, the first frame 27 or the second frame 28 engaging with the corresponding resin frame 26 may be omitted from the structure of the deflector 12 of this embodiment as long as the resin frame 26 is assured to have a sufficient bending rigidity without engaging with the first frame 27 or the second frame 28.

Further, the deflector 12 may be configured so that the deflector body 24 is electrically deployed or retracted in combination with the opening or closing movement of the movable panel 13.

According to the embodiment, the deflector 12 includes the deflector body 24 configured to be provided along the front edge portion of the roof opening portion 10a formed on the roof 10 of the vehicle and to be deployed by projecting above the surface of the roof 10. The deflector body 24 includes the mesh member 25 extending along the front edge portion of the roof opening 10a. The deflector 12 also includes the pair of resin frames 26, 26 provided at the end portions of the mesh member 25 in the widthwise direction of the mesh member 25 respectively to extend in the lengthwise direction of the mesh member 25 over the entire length of the mesh member 25. The pair of resin frames 26, 26 is resin-molded integrally with the mesh member 25 and covers the end portions of the mesh member 25 including the edges 25b, 25b of the mesh member 25 in the widthwise direction of the mesh member 25.

According to the above-described structure, the pair of resin frames 26, 26 is formed at the respective end portions of the mesh member 25 in the widthwise direction thereof by means of, for example, extrusion-molding process. Thus, the resin frames 26, 26 are securely attached to the mesh member 25 so as to be integral with the mesh member 25 at the time when the resin frames 26, 26 are formed. Therefore, the manufacturing man-hour, eventually the manufacturing cost, may be reduced compared to the case where the mesh member 25 and the pair of resin frames 26, 26 are formed independently from each other and attached to each other by means of the appropriate attaching method. In addition, in case that the mesh member 25 and the resin frames 26, 26 are formed independently from each other and attached to each other by means of the appropriate attaching method, the wrinkles might occur on the mesh member 25 during the attaching process. However, according to the above-described structure, such wrinkles may be controlled. In addition, the distance (or a pitch) between the pair of resin frames 26, 26, which securely supports the mesh member 25 therebetween, is determined by means of the resin-molding equipment (for example, the metal mold die) for forming the resin frames 26, and thus, the variation of the distance between the pair of resin frames 26, 26 may be controlled. Consequently, the appearance of the mesh member 25 (the deflector body 24) when the deflector body 24 projects above the upper surface of the roof 10 may be enhanced. In addition, each of the pair of resin frames 26, 26 has the substantially three-sided rectangular shape so as to cover the entire end portions of the mesh member 25 in the widthwise direction including the edges 25b, 25b, and thus the rigidity of the resin frame 26 increases corresponding to the increment in the modulus section of the resin frame 26.

According to the embodiment, the plurality of through holes 25a include first through holes 25a1 arrayed in a first row R1 at a regular spacing in the lengthwise direction of the mesh member 25 and second through holes 25a2 arrayed in a second row R2 at the regular spacing in the lengthwise direction of the mesh member 25. The first row R1 and the second row R2 are arranged to alternate with each other in the widthwise direction of the mesh member 25, and the first row R1 and the second row R2 offset in the lengthwise direction of the mesh member 25 by half the regular spacing.

According to the above-described structure, the plurality of through holes 25a include the first through holes 25a1 arrayed in the first row R1 at the regular spacing in the lengthwise direction of the mesh member 25 and the second through holes 25a2 arrayed in the second row R2 at the regular spacing in the lengthwise direction of the mesh member 25. The first row R1 and the second row R2 are arranged to alternate with each other in the widthwise direction of the mesh member 25, and the first row R1 and the second row R2 offset in the lengthwise direction of the mesh member 25 by half the regular spacing. In other words, the through holes 25a are arranged in a staggered arrangement. Thus, the resin frames 26, 26 are connected to or attached to the mesh member 25 via the plural through holes 25a in a secure manner, thereby restricting the mesh member 25 from coming apart or detaching from the resin frames 26, 26.

According to the embodiment, the deflector body 24 includes the first frame 27 and the second frame 28 both engaging with the pair of resin frames 26, 26 respectively along the lengthwise direction of the pair of resin frames 26, 26 over the entire length of each of the pair of resin frames 26, 26 and the side frame 29 extending in the widthwise direction of the mesh member 25 and connected to the end portion of the first frame 27 and to an end portion of the second frame 28. A distance between the first frame 27 and the second frame 28 in the widthwise direction of the mesh member 25 is increased by means that the first frame 27 and the second frame 28 engage with the side frame 29.

According to the above-described structure, the resin frames 26, 26 engage with the first and second frames 27, 28 respectively over the entire length of the resin frame 26 along the lengthwise direction thereof, and the end portions of the first frame 27 and the end portions of the second frame 28 in the lengthwise direction thereof are connected to the side frames 29, 29. Thus, the mesh member 25 is firmly supported in the lengthwise and widthwise directions thereof by the first and second frame 27, 28 and the side frames 29, 29, which may restrict the wrinkles from occurring on the mesh member 25. On the other hand, the distance between the first frame 27 and the second frame 28 in the widthwise direction of the mesh member 25 is increased by engaging the first and second frames 27, 28 with the side frames 29, 29 respectively, and thus, the tension is generated at the mesh member 25 in the direction in which the mesh member 25 shrinks. Thus, the tension is applied via the resin frame 26 to the engaging portion between the first frame 27 and the corresponding resin frame 26 and to the engaging portion between the second frame 28 and the corresponding resin frame 26. This may control the occurrence of the clatter between the resin frames 26, 26 and the first and second frames 27, 28, and the abnormal noise caused by such clatter.

According to the embodiment, the first frame 27 and the second frame 28 are formed to be curved in the middle portion of the first frame 27 and the second frame 28 in the lengthwise direction of the first frame 27 and the second frame 28 in a manner that the first frame 27 and the second frame 28 are away from each other in the widthwise direction of the mesh member 25.

According to the above-described structure, the first frame 27 and the second frame 28 are formed so as to be curved in the middle portion of the first frame 27 and the second frame 28 in the lengthwise direction thereof in a manner that the first frame 27 and the second frame 28 are away from each other in the widthwise direction of the mesh member 25. In other words, the first frame 27 and the second frame 28 are formed in the above-described curved manner so that the mesh member 25 is stretched in the widthwise direction thereof. Thus, the occurrence of the clatter and of the abnormal noise caused by the clatter between the resin frame 26 and the first and second frames 27, 28 may be controlled.

According to the embodiment, the deflector 12 further includes the arm member (23 of which first end portion is connected to the front end portion of the roof opening portion 10a in the pivotable manner and of which second end portion is connected to the side frame 29 in the pivotable manner. The deflector 12 further includes the guide pin 29d provided at the side frame 29 in the projecting manner, and the guide member 16 fixedly attached to the front end portion of the roof opening portion 10a and including the guide groove 16a engaging with the guide pin 29d. The deflector body 24 is deployed in a manner that the deflector body 24 projects above the surface of the roof 10 by means that the guide pin 29d guided by the guide groove 16a moves in the rearward and upward when the arm member 23 pivots in the clockwise direction, and the deflector body 24 is retracted in a manner that the deflector body 24 is pulled below the surface of the roof 10 while inclining in the front direction of the vehicle by means that the guide pin 29d guided by the guide groove 16a moves forward when the arm member 23 pivots in the counterclockwise direction.

According to the above-described structure, the deflector body 24 is movable between the deployed position where the deflector body 24 projects above the upper surface of the roof 10 and the retracted position where the deflector body 24 is retracted below the upper surface of the roof 10. In particular, when the deflector body 24 is in the retracted position, the deflector body 24 is retracted below the upper surface of the roof in the state where the deflector body 24 is inclined in the front direction. Thus, the retracting space that is necessary to be provided below the upper surface of the roof 10, that is, the depth of the retracting member 15 in the vertical direction, is reduced. This enables the deflector body 24 (the mesh member 25 to be formed sufficiently long in the widthwise direction of the mesh member 25 so as to rise and stand sufficiently high in the deployed position, thereby allowing air to pass through the mesh member 25, that is, through the plural through holes 25a, when the deflector body 24 is in the deployed position. In addition, the position of the upper end portion of the deflector body 24 when the deflector body 24 is in the deployed position is defined by means that the rear end of the guide groove 16a and the guide pin 29d coincide with each other, and thus the variation of the position of the upper end portion of the deflector body 24 in the deployed position may be controlled.

According to the embodiment, the arm member 23 is made of the wire.

According to the above-described structure, the arm member 23 is made of the wire having the small space requirement, that is, the wire whose projected area in the front direction of the vehicle is small. This restricts the arm member 23 from blocking the air flow outward of the deflector body 24 in the width direction of the vehicle and may eventually reduce a wind noise.

According to the embodiment, the deflector 12 further includes the holding member 21 fixedly attached to the front end portion of the roof opening portion 10a. The arm member 23 includes the holding-side shaft portion 23c which is formed at the first end portion of the arm member 23, bends inward in the width direction of the vehicle and is supported by the holding member 21, and the spring engagement portion 23b defining the bent portion in the width direction of the vehicle. The deflector 12 further includes the torsion spring 22 wound around the holding-side shaft portion 23c and provided at the holding member 21. The one end portion of the torsion spring 22 is fastened to the holding member 21 and the other end portion 22b of the torsion spring 22 engages with the spring engagement portion 23b. The torsion spring 22 biases the deflector body 24 in a manner that the deflector body 24 projects above the surface of the roof 10.

According to the above-described structure, which is assembled in advance on the deflector body 24, is attached to the holding member 21 in the following way. First, the arm member 23 is elastically deformed in the outward direction in the width direction of the vehicle and the holding-side shaft portion 23c is inserted into the shaft bearing hole 21a of the holding member 21 by using the counterforce generated due to the elastic deformation of the arm member 23. Next, the other end portion 22b of the torsion spring 22 that is provided in advance at the holding member 21 is engaged with the spring engagement portion 23b of the arm member 23 while moving the other end portion 22b of the torsion spring 22 in the width direction of the vehicle. Thus, the attachment operation of the arm member 23, which is assembled in advance on the deflector body 24, to the holding member 21 (that is, to the roof 10) is completed while retaining the state where the arm member 23 is assembled on the deflector body 24. On the other hand, the arm member 23 and the deflector body 24 to which the arm member 23 is assembled on and removed from the holding member 21 in the following way. First, the other end portion 22b of the torsion spring 22 which engages with the spring engagement portion 23b is moved in the width direction of the vehicle so as to be disengaged from the spring engagement portion 23b. Next, the arm member 23 is elastically deformed in the outward direction in the width direction of the vehicle and the holding-side shaft portion 23c is pulled out of the shaft bearing hole 21a of the holding member 21. Thus, the arm member 23 is removed from the holding member 21. As explained above, in the state where the arm member 23 is assembled on the deflector body 24, the arm member 23 is attached to and removed from the holding portion 21, that is, the roof 10 while maintaining the holding member 21 fixedly attached to the front end portion of the roof opening portion 10a. This may enhance the maintainability, including the ease of cleaning and replacing of the deflector 12. In particular, the deflector 12 may be attached to and removed from the roof 10 without the need for tools or the like.

According to the embodiment, the deflector 12 which enhances the appearance of the deflector body 24 projecting above the upper surface of the roof 10 of the vehicle and which allows the reduction in the manufacturing man-hour of the deflector body 24 is provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A deflector apparatus for a vehicle, comprising:
a deflector body configured to be provided along a front edge portion of an opening portion formed on a roof portion of the vehicle and to be deployed by projecting above a surface of the roof portion, the deflector body including a mesh member extending along the front edge portion of the opening portion;
a pair of resin frames provided at end portions of the mesh member in a widthwise direction of the mesh member respectively to extend in a lengthwise direction of the mesh member over an entire length of the mesh member, the pair of resin frames being made of a resin material in an extrusion-molding process so as to be integral with the mesh member and covering edges of the mesh member at the end portions of the mesh member in the widthwise direction of the mesh member;
an arm member of which first end portion is connected to a front end portion of the opening portion in a pivotable manner and of which second end portion is connected to a side frame in a pivotable manner;
a guide pin provided at the side frame in a projecting manner; and
a guide member fixedly attached to the front end portion of the opening portion and including a guide groove engaging with the guide pin;
a holding member fixedly attached to the front end portion of the opening portion, wherein the arm member includes a holding-side shaft portion which is formed at the first end portion of the arm member, bends inward in the width direction of the vehicle and is supported by the holding member, and a spring engagement portion defining a bent portion in the width direction of the vehicle; and
a torsion spring wound around the holding-side shaft portion and provided at the holding member, one end portion of the torsion spring being fastened to the holding member and the other end portion of the torsion spring engaging with the spring engagement portion, wherein the torsion spring biases the deflector body in a manner that the deflector body projects above the surface of the roof portion,
wherein:
the deflector body includes a first metal frame and a second metal frame both engaging with the pair of resin frames respectively along a lengthwise direction of the pair of resin frames over an entire length of each of the pair of resin frames and the side frame extending in the widthwise direction of the mesh member and connected to an end portion of the first metal frame and to an end portion of the second metal frame;
a distance between the first metal frame and the second metal frame in the widthwise direction of the mesh member is increased by means that the first metal frame and the second metal frame engage with the side frame;
the deflector body is deployed by projecting above the surface of the roof portion by means that the guide pin guided by the guide groove moves in one direction when the arm member pivots in a first direction;
the deflector body is retracted in a manner that the deflector body is pulled below the surface of the roof portion while inclining in a front direction of the vehicle by means that the guide pin guided by the guide groove moves in the other direction when the arm member pivots in a second direction; and
the arm member is made of a wire.

2. The deflector apparatus according to claim 1, wherein
the mesh member includes a plurality of through holes arranged regularly on the mesh member,
the plurality of through holes include first through holes arrayed in a first row (R1) at a regular spacing in the lengthwise direction of the mesh member and second through holes arrayed in a second row at the regular spacing in the lengthwise direction of the mesh member,
the first row and the second row are arranged to alternate with each other in the widthwise direction of the mesh member, and
the first row and the second row offset in the lengthwise direction of the mesh member by half the regular spacing.

3. The deflector apparatus according to claim 1, wherein
the first metal frame and the second metal frame are formed to be curved in a middle portion of the first metal frame and the second metal frame in a lengthwise direction of the first metal frame and the second metal frame in a manner that the first metal frame and the second metal frame are away from each other in the widthwise direction of the mesh member.

4. A deflector apparatus for a vehicle, comprising:
a deflector body configured to be provided along a front edge portion of an opening portion formed on a roof portion of the vehicle and to be deployed by projecting above a surface of the roof portion, the deflector body including a mesh member extending along the front edge portion of the opening portion;
a pair of resin frames provided at end portions of the mesh member in a widthwise direction of the mesh member respectively to extend in a lengthwise direction of the mesh member over an entire length of the mesh member, the pair of resin frames being resin-molded integrally with the mesh member and covering edges of the mesh member at the end portions of the mesh member in the widthwise direction of the mesh member;
an arm member of which first end portion is connected to a front end portion of the opening portion in a pivotable manner and of which second end portion is connected to a side frame in a pivotable manner;
a guide pin provided at the side frame in a projecting manner;
a guide member fixedly attached to the front end portion of the opening portion and including a guide groove engaging with the guide pin;
a holding member fixedly attached to the front end portion of the opening portion, wherein the arm member includes a holding-side shaft portion which is formed at the first end portion of the arm member, bends inward in the width direction of the vehicle and is supported by the holding member, and a spring engagement portion defining a bent portion in the width direction of the vehicle; and a torsion spring wound around the holding-side shaft portion and provided at the holding member, one end portion of the torsion spring being fastened to the holding member and the other end portion of the torsion spring engaging with the spring engagement portion, wherein the torsion spring biases the deflector body in a manner that the deflector body projects above the surface of the roof portion, wherein:

the deflector body includes a first metal frame and a second metal frame both engaging with the pair of resin frames respectively along a lengthwise direction of the pair of resin frames over an entire length of each of the pair of resin frames and the side frame extending in the widthwise direction of the mesh member and connected to an end portion of the first metal frame and to an end portion of the second metal frame;

a distance between the first metal frame and the second metal frame in the widthwise direction of the mesh member is increased by means that the first metal frame and the second metal frame engage with the side frame;

the deflector body is deployed by projecting above the surface of the roof portion by means that the guide pin guided by the guide groove moves in one direction when the arm member pivots in a first direction;

the deflector body is retracted in a manner that the deflector body is pulled below the surface of the roof portion while inclining in a front direction of the vehicle by means that the guide pin guided by the guide groove moves in the other direction when the arm member pivots in a second direction; and the arm member is made of a wire.

5. The deflector apparatus according to claim 1, wherein the side frame is fastened to the end portion of the first frame and the second frame by bolts.

* * * * *